(12) United States Patent
Kataoka et al.

(10) Patent No.: US 11,953,016 B2
(45) Date of Patent: Apr. 9, 2024

(54) BLOWER

(71) Applicant: Koki Holdings Co., Ltd., Tokyo (JP)

(72) Inventors: Mikihiro Kataoka, Ibaraki (JP); Naoto Ichihashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 17/635,365

(22) PCT Filed: Jul. 31, 2020

(86) PCT No.: PCT/JP2020/029531
§ 371 (c)(1),
(2) Date: Feb. 14, 2022

(87) PCT Pub. No.: WO2021/039291
PCT Pub. Date: Mar. 4, 2021

(65) Prior Publication Data
US 2022/0341432 A1 Oct. 27, 2022

(30) Foreign Application Priority Data
Aug. 29, 2019 (JP) ................................. 2019-156572

(51) Int. Cl.
*F04D 25/08* (2006.01)
*F04D 29/54* (2006.01)
*F04D 29/58* (2006.01)

(52) U.S. Cl.
CPC ........... *F04D 25/08* (2013.01); *F04D 29/542* (2013.01); *F04D 29/58* (2013.01)

(58) Field of Classification Search
CPC .............. F04D 19/002; F04D 25/0673; F04D 29/54–544; F04D 29/5806; F04D 25/08–086
(Continued)

(56) References Cited

U.S. PATENT DOCUMENTS 4,884,314 A * 12/1989 Miner .................... A01G 20/47
15/419
4,945,604 A * 8/1990 Miner ................... A47L 9/2884
15/410
(Continued)

FOREIGN PATENT DOCUMENTS

CN 1207476 2/1999
CN 203500060 3/2014
(Continued)

OTHER PUBLICATIONS

"International Search Report (Form PCT/ISA/210) of PCT/JP2020/029531," dated Oct. 6, 2020, with English translation thereof, pp. 1-6.
(Continued)

*Primary Examiner* — Alexander B Comley
(74) *Attorney, Agent, or Firm* — JCIPRNET

(57) ABSTRACT

A blower has: a fan generating an air flow in an axial direction of a rotary shaft; a tubular motor holder 30 formed in a tubular shape and holding the motor radially inside thereof; and a fan case part accommodating the motor, the motor holder, and the fan and forming an air flow path. A first rectification parts that is integrally formed is provided on an inside portion of the fan case part. The first rectification part is formed in a rib shape by a first to fourth blade, weakens a rotational component of a flow of air discharged from the fan, and guides the air to smoothly flow in the axial direction. The motor holder is configured so as to have an axial length smaller than the motor.

13 Claims, 10 Drawing Sheets

(58) Field of Classification Search
USPC .......................................................... 417/234
See application file for complete search history.

(56) References Cited

U.S. PATENT DOCUMENTS

| | | | |
|---|---|---|---|
| 6,302,640 | B1 | 10/2001 | McKelvey |
| 2014/0050600 | A1* | 2/2014 | Kodato .................. A01G 20/47 |
| | | | 417/360 |
| 2014/0140861 | A1* | 5/2014 | Pellenc ............... F04D 25/0673 |
| | | | 417/63 |
| 2017/0021489 | A1* | 1/2017 | Bylund ................. F04D 19/002 |

FOREIGN PATENT DOCUMENTS

| | | | | |
|---|---|---|---|---|
| CN | 105747989 | | 7/2016 | |
| EP | 3075229 A1 | * | 10/2016 | ............. A01G 20/43 |
| GB | 2012362 A | * | 7/1979 | ............. A45D 20/12 |
| JP | S5495001 | | 7/1979 | |
| JP | S56129880 | | 10/1981 | |
| JP | H0222051 | | 2/1990 | |
| JP | H03501814 | | 4/1991 | |
| JP | 3064973 | | 1/2000 | |
| JP | 2014137030 | | 7/2014 | |
| JP | 2016044586 | | 4/2016 | |
| JP | 2016078005 | | 5/2016 | |
| JP | 2016078005 A | * | 5/2016 | |

OTHER PUBLICATIONS

"Office Action of China Counterpart Application" with English translation thereof, issued on Jan. 12, 2024, p. 1-p. 21.

* cited by examiner

BLOWER

CROSS-REFERENCE TO RELATED APPLICATION

This application is a 371 application of the International PCT application serial no. PCT/JP2020/029531, filed on Jul. 31, 2020, which claims the priority benefits of Japan Patent Application No. 2019-156572, filed on Aug. 29, 2019. The entirety of each of the above-mentioned patent applications is hereby incorporated by reference herein and made a part of this specification.

TECHNICAL FIELD

The present invention relates to a portable blower which suctions air into a housing from an intake port by rotation of a fan accommodated in a main body housing and discharges the air from a discharge port outside of the main body housing.

BACKGROUND ART

A blower described in Patent Literature 1 is known as a conventional portable blower. This blower has a configuration in which external air is taken in from an intake port formed in a housing by a fan driven by a motor, and the suctioned air is blown out to an arbitrary region through a nozzle provided at an air outlet. An operator grips a handle part of the blower and performs work while a tip of the nozzle is pointed toward a region to be blown at. The work with a blower includes, for example, a work of blowing off dust on the ground, and the handle part is held so that the nozzle faces diagonally downward and forward, and dust and the like on the ground is blown away while a housing of a main body is swung to the left and right and the tip of the nozzle is swung to the left and right. A centrifugal fan or an axial flow fan is used as the blower, and the intake port (an opening) of the housing for taking in air passing through the fan is disposed in the vicinity of the motor. Further, in the blower of Patent Literature 1, the motor is disposed in the vicinity of an axial center of the main body housing while the entire motor is accommodated inside the substantially tubular main body housing with a motor casing therebetween. The motor casing includes an inner tubular portion which accommodates the motor and an outer tubular portion which is in contact with an inner surface of the housing, and due to a stationary blade part extending radially between the inner tubular portion and the outer tubular portion being formed, an effect of rectifying an air flow in the housing is generated, the air blowing performance is improved, and noise and the like are reduced. Further, a separate rectification cone is mounted on a downstream opening portion of the inner tubular portion which holds the motor, and a plurality of auxiliary stationary blades extending outward is formed on an outer surface of the rectification cone.

CITATION LIST

Patent Literature

Patent Literature 1: Japanese Patent Laid-Open No. 2014-137030

SUMMARY OF INVENTION

In the portable blower, preferably, an axial length of the stationary blade is long to enhance the rectification effect of the stationary blade. However, in a blower having a configuration in which a stationary blade is provided on the motor casing, since an increase in a size of the stationary blade causes an increase in a size of the motor casing, eventually, the housing becomes large and heavy, and portability of the blower is impaired. In addition, since cooling properties of the motor are impaired from the relationship in which the entire motor is accommodated by the inner tubular portion of the motor casing, it is necessary to design the motor in full consideration of cooling measures. Further, it is not preferable in terms of molding to provide a plurality of stationary blades on an outer peripheral surface of the rectification cone or the like on the motor casing side, and depending on the configuration of the stationary blades, the number of parts may be too high and an increase in manufacturing costs of the product may be caused.

Technical Problem

The present invention has been made in view of the above-described background, and an objective thereof is to provide a blower capable of improving air blowing performance and reducing noise while an increase in a size of a housing is avoided. Another objective of the present invention is to provide a blower having a motor with an improved cooling performance. Still another objective of the present invention is to provide a blower in which increase in manufacturing costs is curbed by devising a shape of a stationary blade formed on an inner wall part of a housing so that the stationary blade can be molded by injection molding similar to a conventional one.

Solution to Problem

The typical features of the invention disclosed in the present application will be described as follows. According to one feature of the present invention, there is provided a blower including a motor with a rotary shaft, a fan configured to be rotated by a driving force of the motor and to generate an air flow in an axial direction of the rotary shaft, a tubular motor holder formed in a tubular shape extending in the axial direction and configured to hold the motor radially inside thereof, a fan case formed in a tubular shape extending in the axial direction, configured to accommodate the motor, the motor holder, and the fan and to form a flow path of the air flow, and a housing including the fan case and a handle part gripped by an operator, in which the fan case has a first rectification part integrally molded radially inside thereof. The first rectification part may be multiple ribs protruding inward from an inner peripheral surface of the fan case and may be integrally formed with the housing. Here, a length of the motor holder in the axial direction is shorter than that of the motor.

According to another feature of the present invention, the fan case may be formed of two members divided in a left and right direction perpendicular to the axial direction, and the multiple ribs may extend in the left and right direction. With such a configuration, the present invention can be easily realized simply by changing a shape of a mold at the time of injection molding of the housing. Further, the multiple ribs extend from an inner peripheral surface in a direction orthogonal to a dividing surface of two members. Also, in a view in the left and right direction, the shape of the rib on the side away from the fan in the axial direction is formed to approach the rotary shaft, and the side of the rib near the fan is configured to include a portion inclined with respect to the rotary shaft and extending.

According to yet another feature of the present invention, the motor may include a covered part of which a radial outside is covered by the motor holder and an exposed part of which a radial outside is not covered by the motor holder. The fan case portion of the housing may have a tapered part narrowed so that a diameter decreases away from the motor in the axial direction on a downstream side of the motor in a flow path direction of the air flow, and most or the whole of the first rectification part may be disposed on the tapered part. Further, the first rectification part may include a first support part in contact with and supporting an outer peripheral surface of a bearing holder of the motor.

According to still another feature of the present invention, the motor holder may have a second rectification part integrally molded radially outside thereof. The second rectification part may be formed on a second support part in contact with the motor and the fan case and supporting the motor. Further, the second rectification part may be in contact with the fan case via an elastic body. Furthermore, the second rectification part may include a first rib extending in the radial direction and a second rib extending obliquely in the axial direction.

Effects of Invention

According to the present invention, since a first rectification part is formed on the inner peripheral side of a fan case, a swirling flow of air discharged from a fan can be attenuated, air blowing performance can be improved, and noise can be reduced. Further, since a second rectification part is formed on a motor holder, it is possible to support a motor in addition to rectifying wind emitted from the fan. Furthermore, since the motor holder supports a part of the motor without covering the entire motor, an outer surface of the motor is exposed to an air flow, and cooling performance of the motor is improved. In addition, since the entire outer side of the motor is not covered, a size and weight of the motor holder can be reduced, and a weight of the entire blower can be reduced.

DESCRIPTION OF EMBODIMENTS

Embodiment 1

Figure 1:
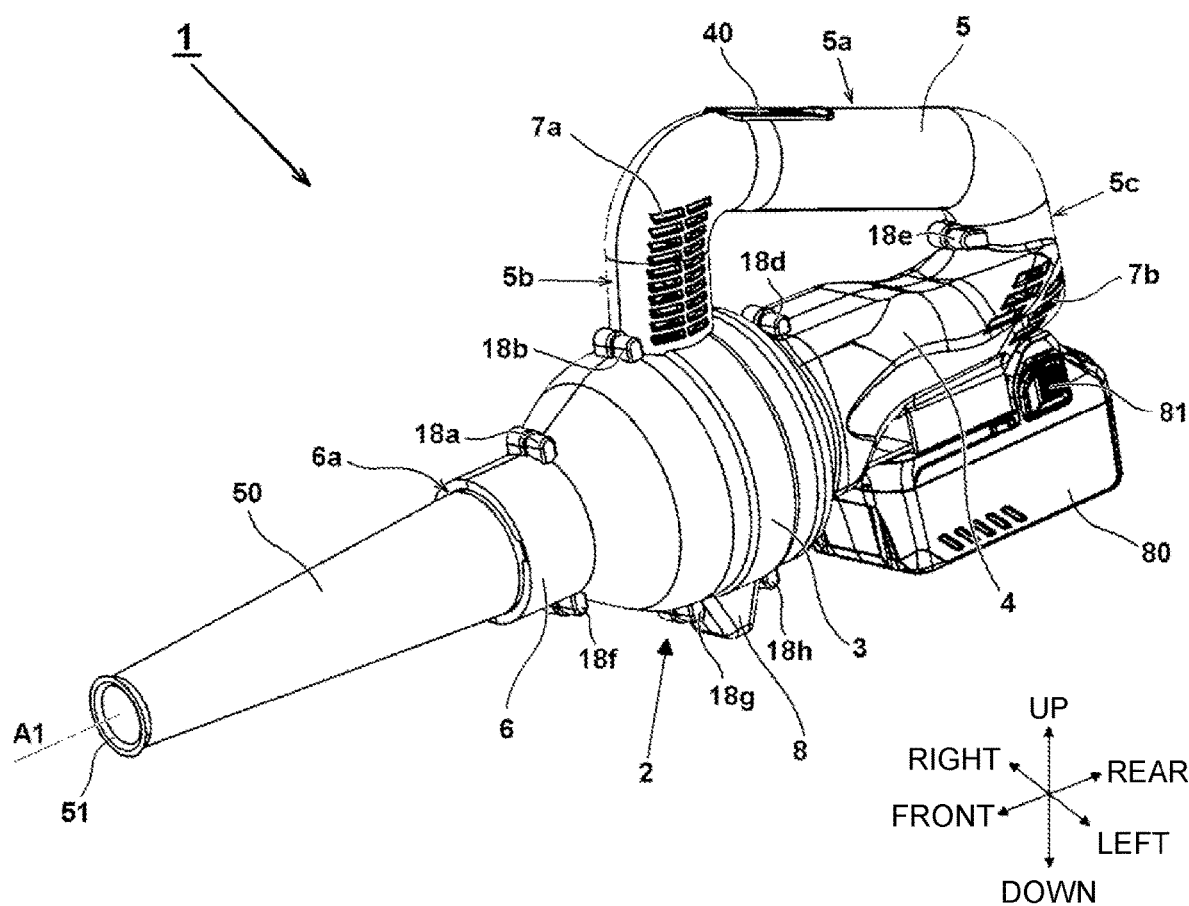
FIG. 1 is a perspective view showing an overall configuration of a blower 1 according to an embodiment of the present invention.

Hereinafter, embodiments of the present invention will be described with reference to the drawings. In the following drawings, parts which are the same are designated by the same reference numerals, and repeated description thereof will be omitted. Further, in the present specification, forward and backward and upward and downward directions used in the description are as the directions shown in the drawings.

In FIG. 1, a cordless portable blower 1 includes, for example, a motor 11 (described later in FIG. 2) and a fan 16 (described later in FIG. 2) inside a housing 2 made of a resin, and a motor 11 (not shown) is driven by electric power of a battery pack 80. An air flow generated by rotation of a fan 16 (not shown) is injected forward via a nozzle 50. An operator grips a handle part 5 of the blower 1 to perform work. Generally, the blower 1 is held with the nozzle 50 facing diagonally and forward and downward, and while a tip of the nozzle 50 is swung forward and backward and left and right by shaking the handle part 5 forward and backward and left and right, dust in a region to be cleaned such as a desk or a floor surface is blown away.

The housing 2 is configured of a fan case part 3 having a shape with a protruding diameter near a center thereof in the forward and backward direction, a battery mounting part 4 formed in a thin tubular shape behind the fan case part 3, a handle part 5 which connects a central portion of the fan case part 3 to the rear side of the battery mounting part 4, and a cylindrical tip part 6 formed on the front side of the fan case part 3, and these are integrally manufactured by molding a synthetic resin. The housing 2 is formed in a state in which it is divided into two portions by a dividing surface at the center in the left and right direction, and the two separate portions are fixed by multiple screws described later. Multiple screw bosses 18a to 18m (18c and 18i to 18m are not visible in FIG. 1) are formed in the left portion of the housing 2, and screw bosses having screw holes are formed at positions corresponding to those on the right side of the housing 2.

The handle part 5 is a part that the operator grips with one hand, and in a front portion of the handle part 5, a front connection part 5b extending in a substantially vertical direction is formed and connected to an upper surface of the fan case part 3, and in a rear portion thereof, a rear connection part 5c is connected to a rear end portion of the battery mounting part 4. A switch panel 40 for turning on or off the motor 11 (which will be described later in FIG. 2) is provided on the upper side of a grip part 5a of the handle part 5. First intake ports 7a are formed in left and right side surfaces of the front connection part 5b of the handle part 5. The first intake port 7a is an opening for suctioning external air here, and has multiple slits having an elongated shape in a horizontal direction. Second intake ports 7b are provided in left and right side surfaces of the battery mounting part 4 on the rear side. The first intake port 7a and the second intake port 7b serve as the intake ports of the blower 1.

The battery pack 80 is mounted below the battery mounting part 4 of the housing 2. In order to mount the battery pack 80, two rail parts (not visible in the drawing) extending horizontally in the forward and backward direction with a predetermined distance therebetween in the left to right direction are formed on the battery mounting part 4, and the battery pack 80 is mounted by horizontally moving it from the rear side to the front side of the housing 2 along the rail parts. When the battery pack 80 is removed from the housing 2, the battery pack 80 is horizontally moved to the rear side of the housing 2 while latch buttons 81 provided on both the left and right side surfaces are pushed. The battery pack 80 is widely used in power tools, and has multiple battery cells (not shown) accommodated inside a case made of a synthetic resin. The battery cell is a secondary battery which can be repeatedly charged and discharged, and a known battery cell such as a lithium ion battery cell is used. An output of the battery pack 80 may be, for example, 18 V or 36 V DC, but a voltage thereof is arbitrary.

When the battery pack 80 is mounted in the housing 2, the blower 1 can be stably placed on a desk or the like via a bottom surface of the battery pack 80 and leg parts 8 formed on the front side of the housing 2. The leg parts 8 are manufactured integrally with the fan case part 3 by molding a synthetic resin. The nozzle 50 is a separate component connected to an opening 6a formed on the front side of the tip part 6 of the housing 2, and is formed in a tapered shape which has a small diameter at a tip thereof and gradually becomes thicker from a discharge port 51 toward the rear in a direction of an axis A1. The nozzle 50 has a predetermined axial length in order to increase a flow velocity by narrowing a flow path of the air discharged from the tip part 6 and to make it easier to apply the air flow to a specific object. The nozzle 50 is manufactured by integrally molding a synthetic resin. The nozzle connected to the tip part 6a is not limited to the nozzle 50 having the shape shown in FIG. 1, and various nozzles and extension pipes such as a nozzle in which a tip of a cylindrical straight pipe is bent in a flat plate shape, a curved pipe, and the like may be used.

Figure 2:
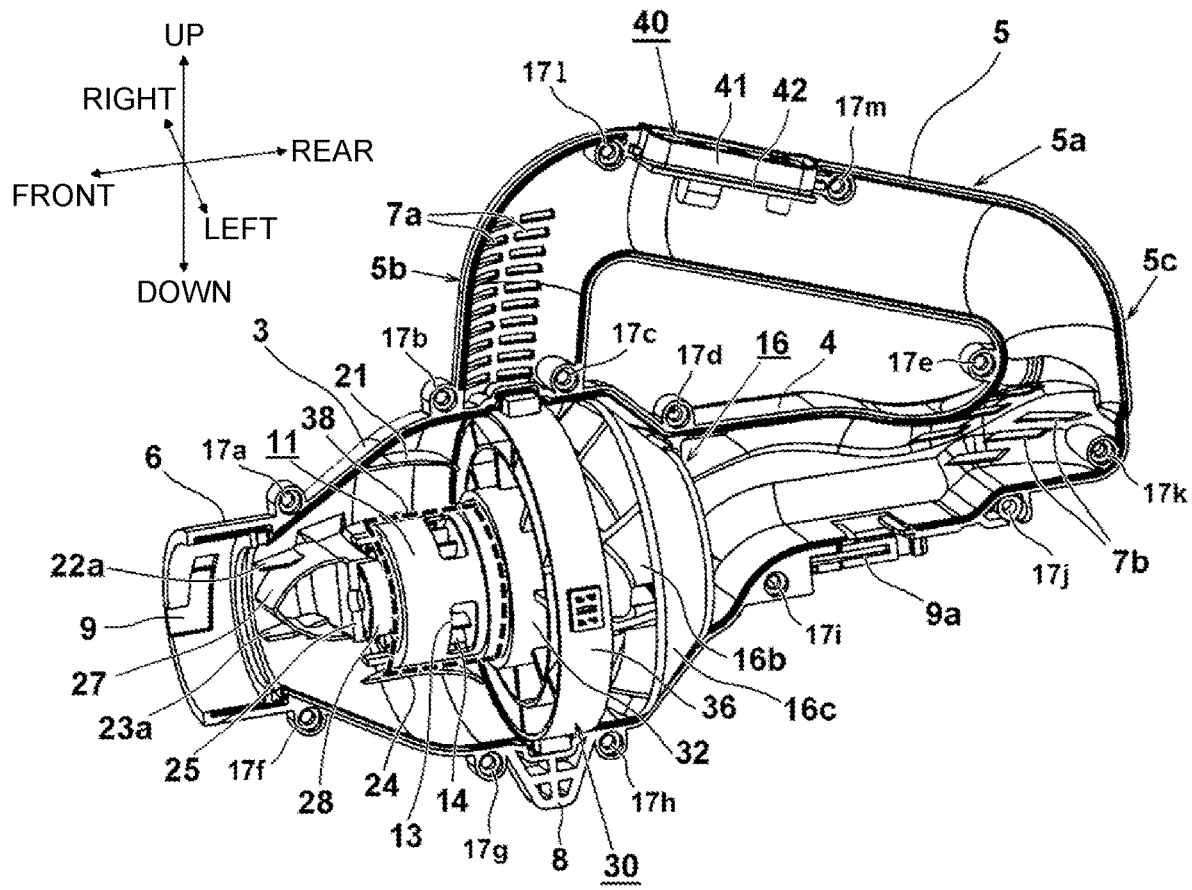
FIG. 2 is a perspective view of the blower 1 of FIG. 1 in a state in which a housing 2 and a nozzle 50 on the left side thereof are removed.

FIG. 2 is an exploded perspective view of the blower 1 according to the embodiment of the present invention and shows a state in which the nozzle 50 and a left portion of the housing 2 are removed. The housing 2 is configured of the fan case part 3, the battery mounting part 4, the handle part 5, and the tip part 6, and is formed to be divided into left and right parts by a vertical plane passing through the rotation axis of the motor 11. Screw bosses 17a to 17m having screw holes are formed in the right part of the housing 2, and the right part is fixed to the left part of the housing 2 by screws (not shown). The fan case part 3 is part of the housing 2 and is formed in a tubular shape for accommodating the motor 11 and the fan 16 therein. In the fan case part 3, the motor 11 is held by the motor holder 30 at a position concentric with an axial center of the tip part 6.

Figure 3:
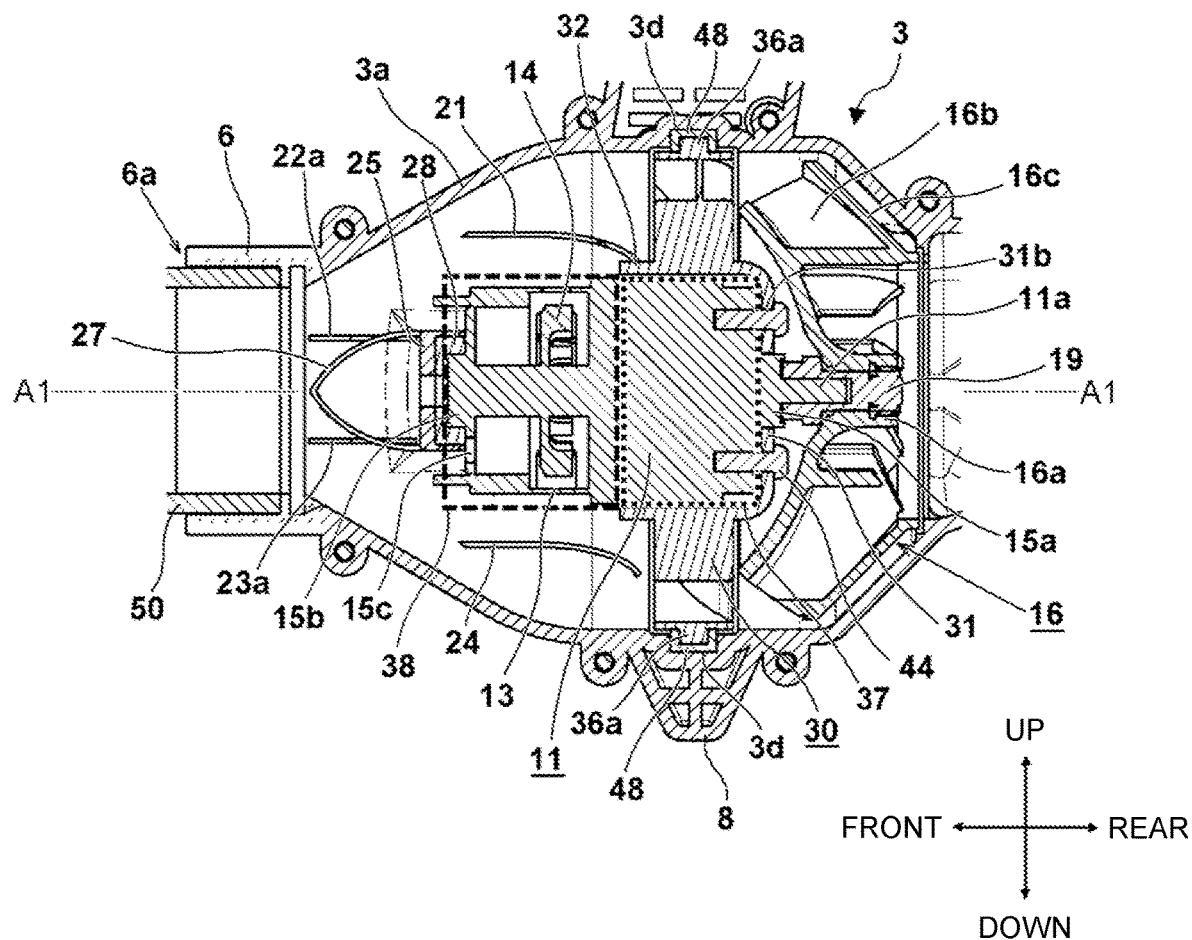
FIG. 3 is a vertical cross-sectional view of the blower 1 of FIG. 1 in a state in which the housing 2 on the left side thereof is removed.

The motor 11 is a DC motor with a brush accommodated in a casing made of a metal. A centrifugal type cooling fan 14 is provided inside the motor 11. A fan 16 is provided on a rotary shaft 11a (refer to FIG. 3 shown later for reference numerals therefor) protruding behind the motor 11. The fan 16 is manufactured by integrally molding a synthetic resin, multiple curved blades 16b extending obliquely forward in an axial direction from a central rotary shaft part 16a is formed, and a conical shroud 16c is provided to connect outer edges of the blades 16b.

A rotary shaft of the motor 11 (not visible in the drawing) is disposed coaxially with the axis A1 (refer to FIGS. 1 and 3), and the fan 16 is pivotally supported via the rotary shaft of the motor 11. The motor holder 30 is formed by integrally molding a synthetic resin, an outer tubular part 36 which is in contact with an inner wall surface of the housing 2 is formed on the outside of the motor holder 30 in a radial direction, and an inner tubular part 32 which is in contact with an outer peripheral surface of the casing of the motor 11 is formed near the axis A1. Ribs or the like extending in the radial direction are formed between the inner tubular part 32 and the outer tubular part 36, and the outer tubular part 36 and the inner tubular part 32 are fixed to be concentric with each other. A shape of the motor holder 30 will be described in detail with reference to FIG. 7 and the like.

The handle part 5 is configured of the grip part 5a gripped by an operator, the front connection part 5b which connects a front end of the grip part 5a to the fan case part 3, and a rear connection part 5c which connects a rear end of the grip part 5a to the fan case part 3. Here, a front connection part between the front connection part 5b of the handle part 5 and the fan case part 3 is partitioned so that air cannot flow therebetween. On the other hand, a rear connection part between the handle part 5 and the fan case part 3 is configured so that internal spaces thereof become communicating, and is configured so that air flows between the handle part 5 and the fan case part 3.

The external air taken in through the first intake port 7a flows to the rear side inside the handle part 5, flows from the rear to the front side in a space inside the battery mounting part 4, joins with air drawn in from the second intake port 7b, and reaches the fan 16. The air discharged from the fan 16 to the front side passes through the inside of the outer tubular part 36 of the motor holder 30, reaches a space in which the motor 11 is accommodated (an internal space of the fan case part 3), and is discharged from the tip part 6 to the nozzle 50 side (FIG. 1 side). In the internal space of the fan case part 3, a large amount of air flows mainly to an outer peripheral side portion along an inner wall surface of the fan case part 3, and the air flow near the inner peripheral side near the outer peripheral surface of the motor 11 becomes low. Therefore, although it cannot be said that a cooling effect of the motor 11 is sufficiently high compared to a flow rate of the flowing air, in the present embodiment, the motor 11 in which an opening part 13 is provided in the outer peripheral surface and the cooling fan 14 is provided inside the opening part 13 is used. The cooling fan 14 suctions air from the opening in a back surface (the front surface side in FIG. 1) of the casing of the motor 11, and discharges the air outward in the radial direction.

A length of the inner tubular part 32 of the motor holder 30 in the direction of the axis A1 is formed to be sufficiently shorter than a length of the motor 11 (however, the rotary shaft is not included in the length). As a result, a region of equal to or more than half of the outer peripheral surface of the casing of the motor 11 is exposed in an air passage through which blown air flows. In the present embodiment, a portion exposed in the air passage is defined as a motor exposed part 38, and a portion covered by the motor holder 30 is defined as a motor covered part 37 (refer to FIG. 4 described later for reference numerals). Since the cylindrical casing of the motor 11 is made of a metal, the cooling performance of the motor 11 can be improved by realizing the motor exposed part 38 adequately. Further, since the opening part 13 can be exposed in the air passage in the fan case part 3 by providing the motor exposed part 38, a sufficient cooling performance inside the motor 11 can be achieved.

At a front end of the motor 11, a convex bearing holder 15a (described later in FIG. 3) protruding outward in the direction of the axis A1 is fixed to a motor support rib (a first support part) 25. At the time of this fixing, a damper 28 is mounted between the motor support rib 25 and the bearing holder 15b to absorb vibration. The motor support rib 25 is formed to extend from an inner wall part of the fan case part 3 in a direction of the dividing surface, and is integrally molded with the housing 2. A second guide part 27 having a curved shape is formed on the front side of the motor support rib 25. The second guide part 27 forms a curved and inclined surface which is continuous forward from an upper surface and a lower surface of the motor support rib 25, and tips of an upper inclined surface and a lower inclined surface are connected to each other. A first guide part 26 having a curved shape is formed on the front side of the motor support rib 25 to prevent air turbulence on the rear surface side of the motor support rib 25. Most of the air flowing through the outer peripheral portion of the motor 11 flows inside the nozzle 50 connected to the tip part 6, and some of the air is suctioned to the rear side inside the internal space of the motor 11 through a suction hole 15c. The second guide part 27 is a guide plate for rectifying the air flow on the downstream side of the motor support rib 25, and the turbulence of the air flow on the downstream side of the motor 11 is curbed.

A plate-shaped first blade 21, second blade 22 (refer to FIG. 5 described later), third blade 23 (refer to FIG. 5 described later), and fourth blade 24 extending to the left from an inner wall are formed on an inner peripheral surface of the fan case part 3 of the housing 2 on the right side. These four blades form a first stationary blade part 20 formed to rectify the air flow inside the fan case part 3. In FIG. 2, only parts 22a and 23a on the front side of the second blade 22 and the third blade 23 can be seen, but shapes of the second blade 22 and the third blade 23 will be described in detail in FIG. 5. The first to fourth blades 21 to 24 are an example of a first rectification part.

The switch panel 40 is disposed on an upper surface of a switch unit 41 equipped with an on-button for rotating the motor 11, an off-button for stopping the rotation, and a battery warning lamp, and a circuit board 42 is provided below the switch unit 41. When the on-button of the switch panel 40 is pressed, the motor 11 rotates, the fan 16 rotates, and external air is suctioned from the first intake port 7a formed in the handle part 5 and the second intake port 7b formed in a rear end side surface of the battery mounting part 4. The suctioned air reaches the fan 16 from the internal space of the battery mounting part 4, passes through a space between the inner tubular part 32 and the outer tubular part 36 of the motor holder 30, flows forward around the motor 11, and reaches the nozzle 50 (refer to FIG. 1) from the tip part 6.

FIG. 3 is a vertical cross-sectional view of the blower 1 of FIG. 2 which passes through the rotation axis A1. The fan case part 3 has a tapered part 3a extending in a tapered shape from the cylindrical tip part 6 side to a large diameter portion which holds the motor holder 30, and has a shape which is deflated in a tapered shape from the rear side of the large diameter portion to the vicinity of the connection part to the battery mounting part 4. The motor 11 is mounted rearward from the motor holder 30 to the front portion. A mounting member 19 made of a metal is provided at a rear end of the rotary shaft 11a of the motor 11, and a fan 16 for blowing air is mounted on the mounting member 19. The motor 11 is disposed so that the rotary shaft 11a is concentric with the axis A1. The fan 16 includes the multiple blades 16b extending rearward in the direction of the axis A1 from the outer peripheral side of the rotary shaft part 16a of which a diameter expands like an umbrella. The conical shroud 16c is connected to rear edges of the blades 16b.

The motor holder 30 is held so that an outer peripheral portion of the outer tubular part 36 is sandwiched between the right part and the left part of the housing 2. A convex part 36a is formed on the upper side of the outer tubular part 36, and is held in a concave part 3d of the housing 2 via an elastic body 48. The outer tubular part 36 is an example of a second support part. The elastic body 48 is a block body made of rubber and having a space (a recessed part) for accommodating the convex part 36a. Similarly, the convex part 36a is formed on the lower side of the motor holder 30 and is held in the concave part 3d of the housing 2 via the elastic body 48.

The motor 11 is a DC motor with a brush accommodated in a cylindrical metal casing, and a rear portion thereof is accommodated in the inner tubular part 32 of the motor holder 30. That is, the inner tubular part 32 becomes a part (a motor accommodating part) which accommodates the motor 11. Two screw holes are formed in a rear wall part 31 of the motor holder 30, and the motor 11 is fixed by screws 44 extending in a direction parallel to the axis A1. A rear portion of the motor 11 is configured as the motor covered part 37 of which an outer peripheral surface is covered with the motor holder 30, and a bearing holder 15a formed on a rear end wall of the motor 11 is held by the motor support rib 25. In this way, most of the outer peripheral surface of the casing of the motor 11 is exposed to the air passage inside the fan case part 3 by holding the motor 11 with the motor holder 30, which covers the rear side, and the motor support rib 25 at the front end. The air discharged from the fan 16 to the front side in the fan case part 3 flows into the nozzle 50 side from the tip part 6.

Figure 4:
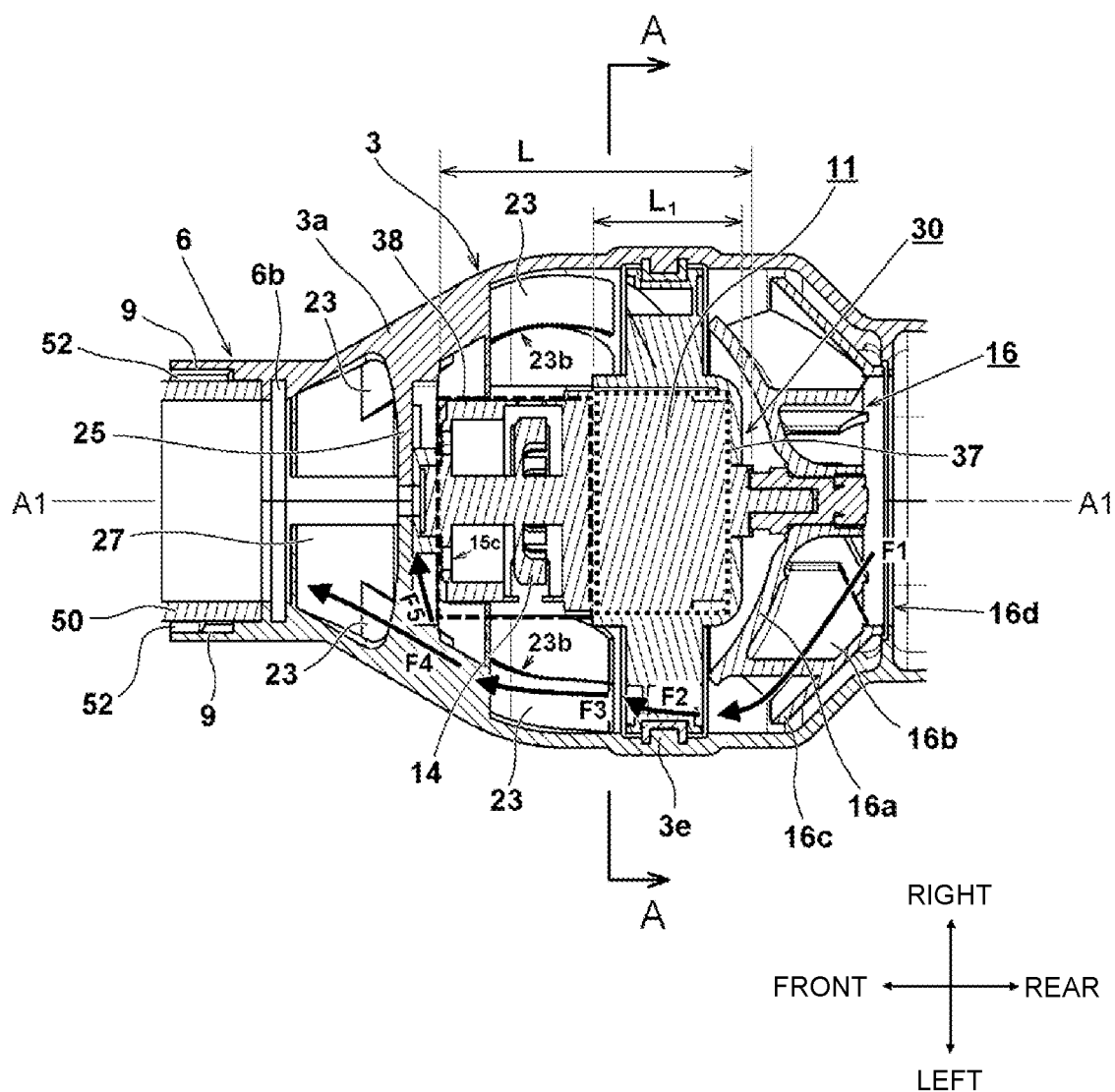
FIG. 4 is a horizontal cross-sectional view along a rotation axis A1 of the blower 1 of FIG. 1.

FIG. 4 is a horizontal cross-sectional view of the blower 1 of FIG. 1 which passes through the rotation axis A1. The motor 11 is disposed at a center position on the left and right so that the rotary shaft thereof coincides with the axis A1. When the motor 11 is rotated by the electric power of the battery pack 80 (refer to FIG. 1), the fan 16 provided at the rotary shaft (an output shaft) 14 (not shown) of the motor 11 rotates, and thus an air flow is generated in directions indicated by arrows F1 to F5.

Around the fan 16, the inner wall surface of the fan case part 3 narrowed in a tapered shape from the front to the rear serves as a fan guide for guiding the air flowing into the fan 16 in a predetermined direction (to the front). The shroud 16c of the fan 16 is disposed at a position close to the inner wall surface of the fan case part 3 to maintain a constant gap. A circular opening 16d is formed on the rear side of the shroud 16c near the axis A1, the air in the battery mounting part 4 is suctioned from the opening 16d by rotation of the fan 16, and the air flows radially outward along the umbrella-shaped rotary shaft part 16a as shown by the arrow F1, and is discharged to the front side. The air discharged from the fan 16 passes through the inside of the motor holder 30 as shown by the arrow F2. That is, the air flow passes through an opening part 39b (described later in FIG. 9) between a middle tubular part 34 and the outer tubular part 36 (both reference numerals of which are referred to in FIG. 5 described later), flows above any of the blades the third blade 23 in this example as shown by the arrow F3) of the first stationary blade part 20, flows above the left side of the motor support rib 25 and above the second guide part 27 as shown by the arrow F4, and reaches the internal space of the tip part 6, that is, the internal space of the nozzle 50. Although the third blade 23 is formed to protrude from the inner wall surface of the fan case part 3 in the direction of the axis A1, an inner peripheral side edge portion 23b thereof is located at a position sufficiently separated from the motor 11, and is not close to the outer peripheral surface of the motor 11. Therefore, some of the air flowing through an inner portion further than the third blade 23 comes into contact with a rear surface of the motor support rib 25, a direction thereof is bent inward, and the air flows as shown by the arrow F5. After that, the air flowing as shown by the arrow F5 flows from the suction hole 15c to the internal space of the motor 11 by the suction of the cooling fan 14.

In the air discharged from the fan 16, the flow of the arrows F1 to F4 in FIG. 4 indicates the air flow flowing from the rear to the front in the space on the left side of the motor 11, but the air flow flowing from the rear to the front in the space on the right side of the motor 11 also reaches the tip part 6 in the same manner. The inner wall surface of the fan case part 3 of the housing 2 on the front side has a shape in which a tip thereof is narrowed toward the cylindrical tip part 6, collects the air flow F4 flowing forward in the direction of the axis A1 along the outer peripheral surface of the motor 11 and the inner wall surface of the fan case part 3, and guides the collected air flow F4 to the cylindrical tip part 6. An annular groove 6b which mounts a mesh-like guard (not shown) for preventing foreign matter from entering from the tip part 6 is formed in the vicinity of a rear end of a cylindrical portion of the tip part 6. Further, the air flow flowing from the rear to the front in the spaces above and below the motor 11 also reaches the tip part 6 in the same flow, but at this time, the first stationary blade part for guidance is not formed in the upper space and the lower space corresponding to the arrow F3.

An outer diameter of the fan case part 3 of the housing 2 has substantially the same horizontal and vertical cross sections, a large diameter at the center in the direction of the axis A1 is formed, and the front side and the rear side thereof are narrowed in a tapered shape. The motor 11 is positioned at the center of the fan case part 3 in the left and right direction by the motor holder 30 having the outer tubular part 36 and the inner tubular part 32 (refer to FIG. 2 for reference numerals), and the axis A1 and the rotary shaft of the motor 11 are disposed concentrically. The air which has passed through the tip part 6 reaches the internal space of the nozzle 50. Two convex parts 52 are formed on the outer peripheral surface near the rear end of the nozzle 50, and engage with a mounting groove part 9 of the tip part 6.

Figure 5:
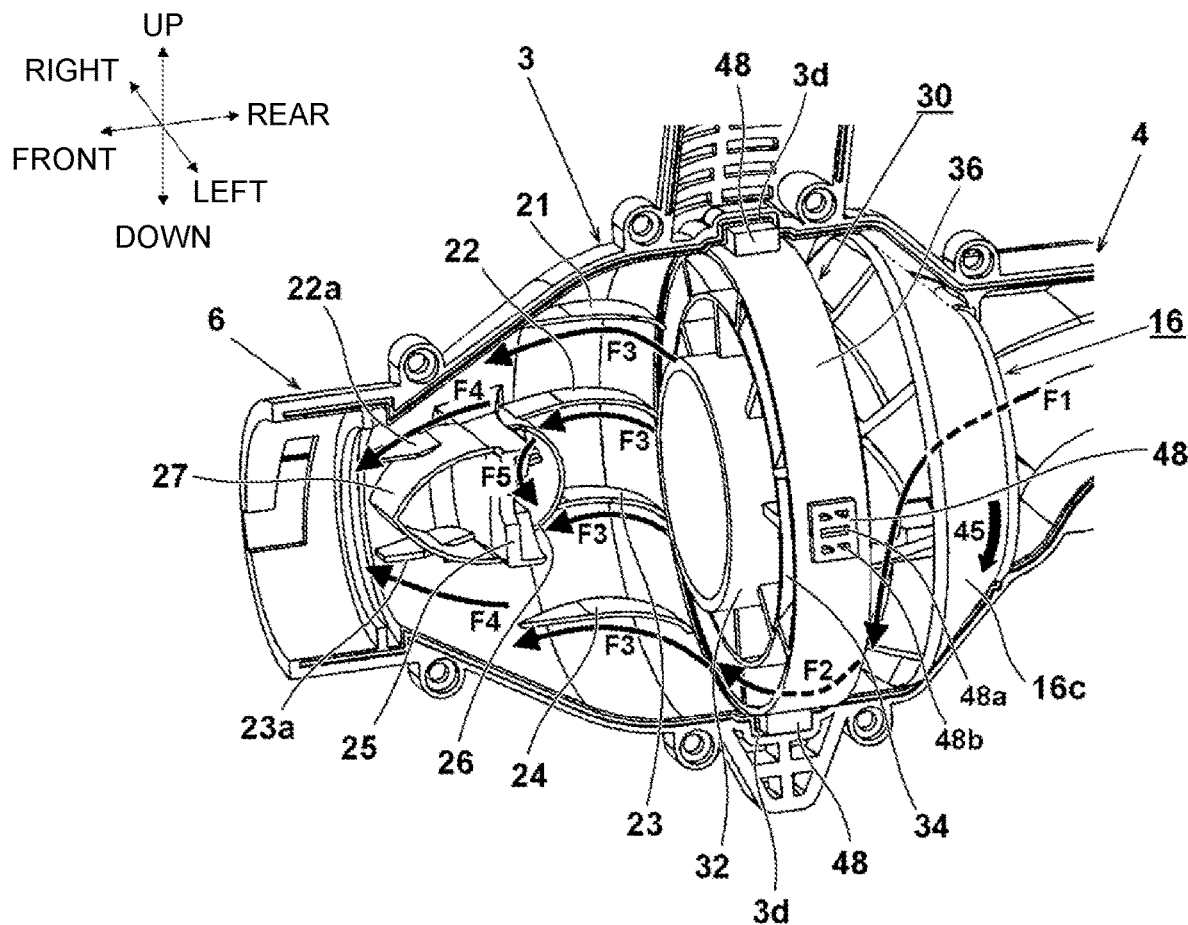
FIG. 5 is a perspective view of the blower 1 of FIG. 1 in a state in which the housing 2 and the motor holder on the right side thereof are mounted, and is a view showing a direction of wind flowing in the housing 2.

FIG. 5 is a perspective view showing a mounting state of the housing 2 and the motor holder 30 on the right side of the blower 1 of FIG. 1, and is a view showing a direction of the wind flowing in the housing 2. The air flow indicated by the arrows F1 to F5 corresponds to the air flow shown in FIG. 4. Here, since the fan 16 rotates in a direction of the arrow 45, the arrows F1 and F2 also flow backward in the axial direction and rotates in the same direction as the arrow 45. A second stationary blade 35 (refer to FIG. 9 described later) having an inclined surface of which a position changes to the front side as it rotates in a circumferential direction is formed between the outer tubular part 36 and the middle tubular part 34 of the motor holder 30 in accordance with this swirling. The air flowing along the second stationary blade 35 passes through the motor holder 30 as shown by the arrow F2 and flows forward. On the front side of the motor holder 30, the air flow F3 flows while swirling to the outer peripheral surface due to a rotational force of the fan 16, but here, the air flow F3 is guided to the first stationary blade part 20 including the first blade 21, the second blade 22, the third blade 23, and the fourth blade 24, and a swirling flow component of the air flow F3 is canceled and rectified to a flow close to an axial flow, and then flows like the air flow F4. Some of the air in the air flow F3 is changed in direction by the motor support rib 25 like the air flow F5, and is guided to the inside of the motor 11 (refer to FIG. 4) by the first guide part 26.

The motor holder 30 is sandwiched by the housing 2 via the elastic body 48 at four locations on the outer peripheral side. On the inner peripheral surface of the housing 2, two concave parts 3d and two convex parts 3e for accommodating the substantially quadrangular elastic body 48 are alternately provided at intervals of 90 degrees in the circumferential direction. The elastic body 48 is a molded rubber product, and concave parts 48a for fitting the convex parts (36d and 3d) formed on the housing 2 or the motor holder 30 is formed therein. The concave part 48a has four hollow parts 48b for adjusting cushioning properties thereof. However, a shape of the elastic body 48 is arbitrary and is not limited to the shape as shown in FIG. 5.

Figure 6:
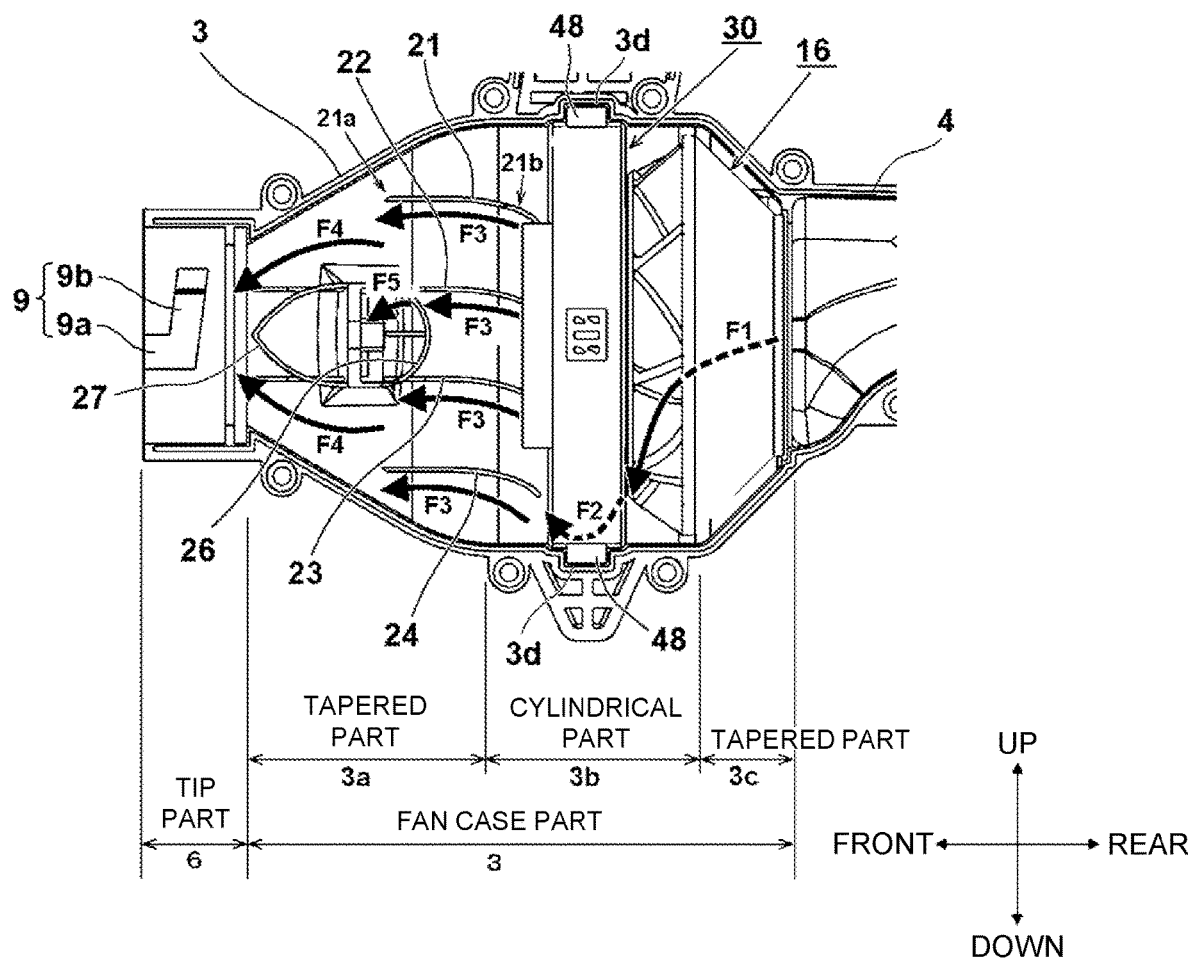
FIG. 6 is a side view of FIG. 5 showing a flow of the wind.

FIG. 6 is a side view of FIG. 5 and is a view showing a flow of wind in the same manner as in FIG. 5. From this drawing, a side surface shape of the first stationary blade part 20 configured of the first blade 21, the second blade 22, the third blade 23, and the fourth blade 24 formed inside the fan case part 3 of the housing 2 is clarified. A side view (a left view) is orthogonal to a mold removal direction of the right part of the housing 2, and from the shapes of the first blade 21, the second blade 22, the third blade 23, and the fourth blade 24, it can be understood that a plate-shaped extending portion thereof coincides with the mold removal direction. On the other hand, when seen in the forward and backward direction of FIG. 6, the shapes of the first blade 21, the second blade 22, the third blade 23, and the fourth blade 24 are not linear, but are slightly curved in order to curb the swirling flow of the air flow F3. For example, when seen from the first blade 21, a rear end portion 21b is curved downward, and the vicinity of a front end 21a is formed to be a substantially horizontal surface. That is, when seen from the left, the first blade 21 is formed to incline and extend from the rear side to the front side with respect to the rotation axis A1 so that the side (the front side) of the first blade 21 away from the fan 16 in the direction of the axis A1 approaches parallel to the rotation axis A1. The second blade 22, the third blade 23, and the fourth blade 24 have the same shape.

The mounting groove part 9 formed in the inner wall portion of the tip part 6 has an L shaped in a side view, and is configured of an axial groove 9a extending parallel to the axis A1 and a circumferential groove 9b extending in the circumferential direction from a rear end of the axial groove. Although only the mounting groove part 9 formed in the right part of the housing 2 is shown in FIG. 6, a similar mounting groove part 9 is formed in the inner peripheral wall surface of the tip part 6 of the left part of the housing 2.

Figure 7:
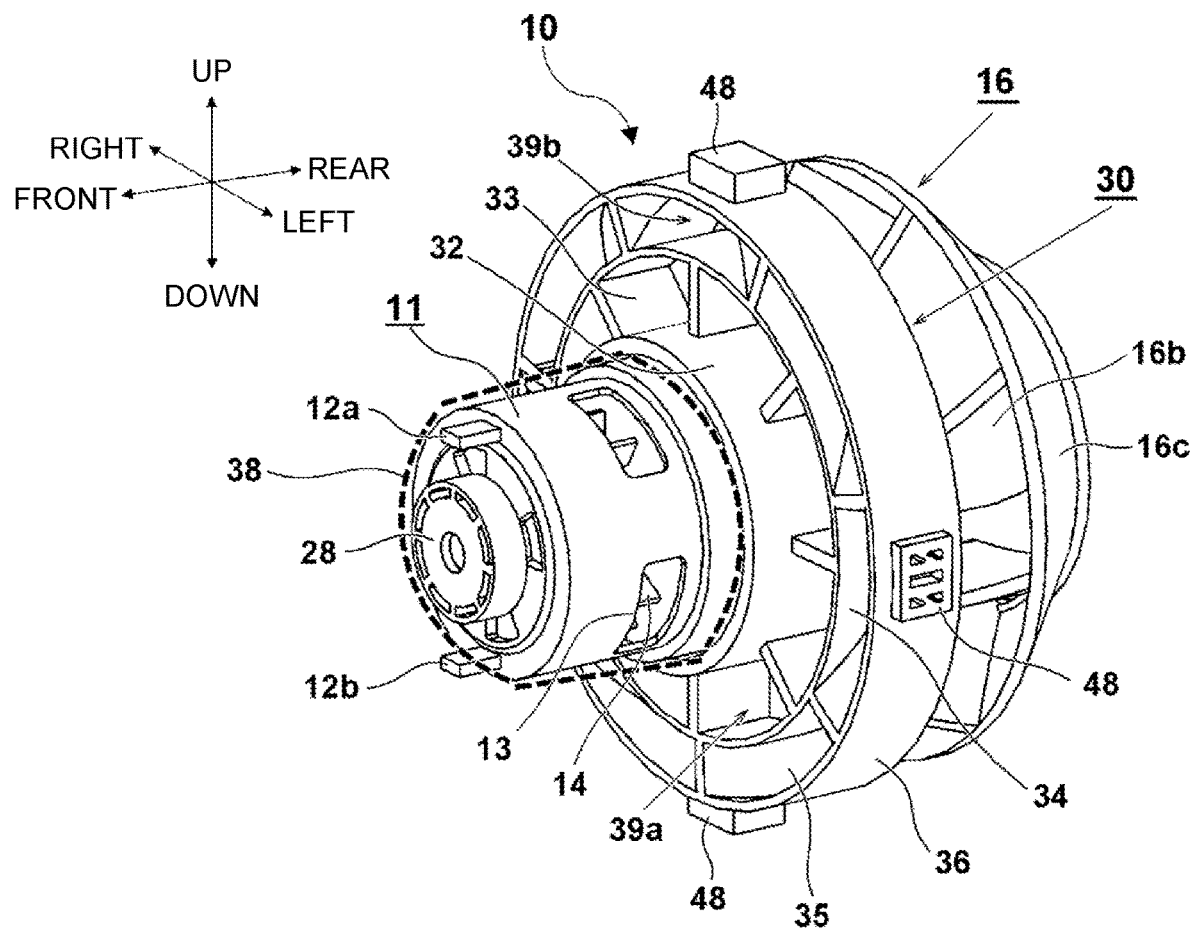
FIG. 7 is a perspective view of a fan assembly 10 in which a motor 11 and a fan 16 are mounted on a motor holder 30 of FIG. 1.

FIG. 7 is a perspective view of a fan assembly 10 in which the motor 11 and the fan 16 are mounted in the motor holder 30 of FIG. 1. The fan assembly 10 is formed by inserting the motor 11 into the inner tubular part 32 of the motor holder 30 from the front side, screwing the motor 11 with screws 44 (refer to FIG. 3), and then fixing the fan 16 to the rotary shaft 11a of the motor 11. Further, the convex parts or the concave parts (not visible in the drawing) are formed at four locations on the outer peripheral surface of the outer tubular part 36 of the motor holder 30, and the elastic body 48 is mounted in each of them. The damper 28 is mounted on the bearing holder 15b (refer to FIG. 3) on the front side of the motor 11. The damper 28 is manufactured by integrally molding a synthetic resin or rubber, and is formed in a cup shape to cover an outer peripheral surface of the bearing holder 15b. Although multiple hollow portions are formed in the damper 28 to curb radial vibration of the bearing holder 15b, it is arbitrary what kind of shape the damper 28 has and what kind of vibration control characteristics it has.

The motor holder 30 has a triple cylindrical part in which the inner tubular part 32, the middle tubular part 34, and the outer tubular part 36 are disposed concentrically. The inner tubular part 32 forms the motor accommodating part, and the inner peripheral surface of the inner tubular part 32 is in contact with the outer peripheral surface of the casing of the motor 11. There is a portion which serves as a main passage of the air discharged from the fan 16 between the middle tubular part 34 and the outer tubular part 36, and the second stationary blade 35 extending diagonally in the circumferential direction is formed there. Seven second stationary blades 35 are formed at equal intervals in the circumferential direction, and each of spaces between them is the opening part 39b. Eight radial ribs 33 extending in the radial direction and the axial direction are formed between the inner tubular part 32 and the middle tubular part 34. Although each of spaces between the eight radial ribs 33 is an opening part 39a which is a space from the fan 16 side to a rear side space of the motor 11, some of the air flow discharged from the fan 16 flows from the rear side to the front side of the motor holder 30 through the opening part 39b.

Figure 8:
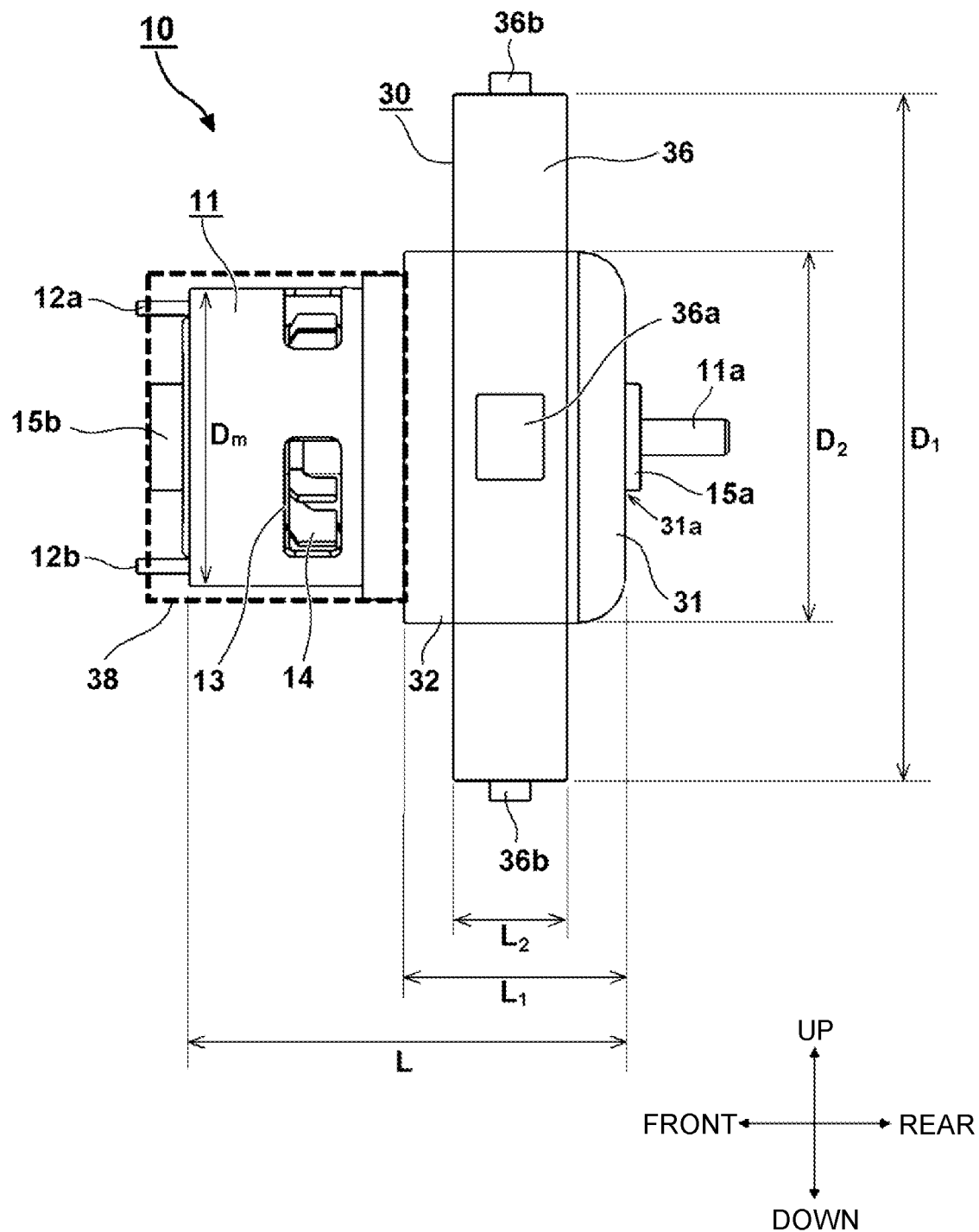
FIG. 8 is a side view of the fan assembly 10 of FIG. 7.

FIG. 8 is a side view of the assembly (the fan assembly 10) of FIG. 7. This state indicates a state in which the elastic body 48 is not mounted. The inner tubular part 32 is a main component of the motor accommodating part, and the rear side of the inner tubular part 32 is the rear wall part 31. An opening 31a (described later in FIG. 9) is formed in the rear wall part 31, and the bearing holder 15a of the motor 11 protrudes rearward from the opening 31a on the rear side. Electrodes 12a and 12b for supplying electric power to the motor 11 are formed at two locations on the rear side of the motor 11. Lead wires (not shown) are connected to the electrodes 12a and 12b, and DC power is supplied to the motor 11.

The convex part 36a for fitting into the concave part of the elastic body 48 is formed on the upper and lower sides of the outer tubular part 36. On the other hand, the concave part 36b is formed on the left side and the right side of the outer tubular part 36 (the right side is not visible in the drawing) so that the elastic body 48 having a substantially rectangular parallelepiped exterior is buried equal to or more than half in the radial direction. The elastic body 48 mounted in the concave part 36b and the elastic body 48 mounted on the convex part 36a are the same component, but are mounted in opposite directions such as outward and inward in the radial direction. A shape and mounting direction of the elastic body 48, a position and number of the concave parts 36b and the convex parts 36a are arbitrary, and other known mounting methods and cushioning mechanisms may be used.

In an approximately rear half of the motor 11 alone (front half in the direction of the blower 1), the outer surface of the casing is exposed in the air passage as shown in the motor exposed part 38. Further, the motor 11 has a cooling fan 14 therein, air is suctioned by the cooling fan 14 from the suction hole 15c (refer to FIG. 3) on the rear side, and is discharged by the cooling fan 14 to the outside through the opening part 13 in the radial direction. Here, assuming that a diameter of the motor is $D_m$, a diameter $D_2$ of the inner tubular part 32 is slightly larger than the diameter $D_m$ of the motor. Specifically, the diameter $D_2$ is a size obtained by adding twice a plate thickness of the inner tubular part 32 and a gap required for mounting to the diameter $D_m$ of the motor. A diameter $D_1$ of the outer tubular part 36 of the motor holder 30 is configured to be sufficiently larger than the diameter $D_2$. The diameter $D_1$ may be about 1.5 to 3 times the diameter $D_2$, and here it is approximately twice. An axial length $L_2$ of the outer tubular part 36 of the motor holder 30 is configured to be shorter than an axial length L of the motor 11 and an axial length $L_1$ of the inner tubular part 32. The motor 11 is stably held at an axial center position inside the housing 2 by adjusting a balance between positions of the inner tubular part 32 and the outer tubular part 36, a position of the center of gravity of the motor 11 and a position of the bearing holder 15b.

Figure 9:
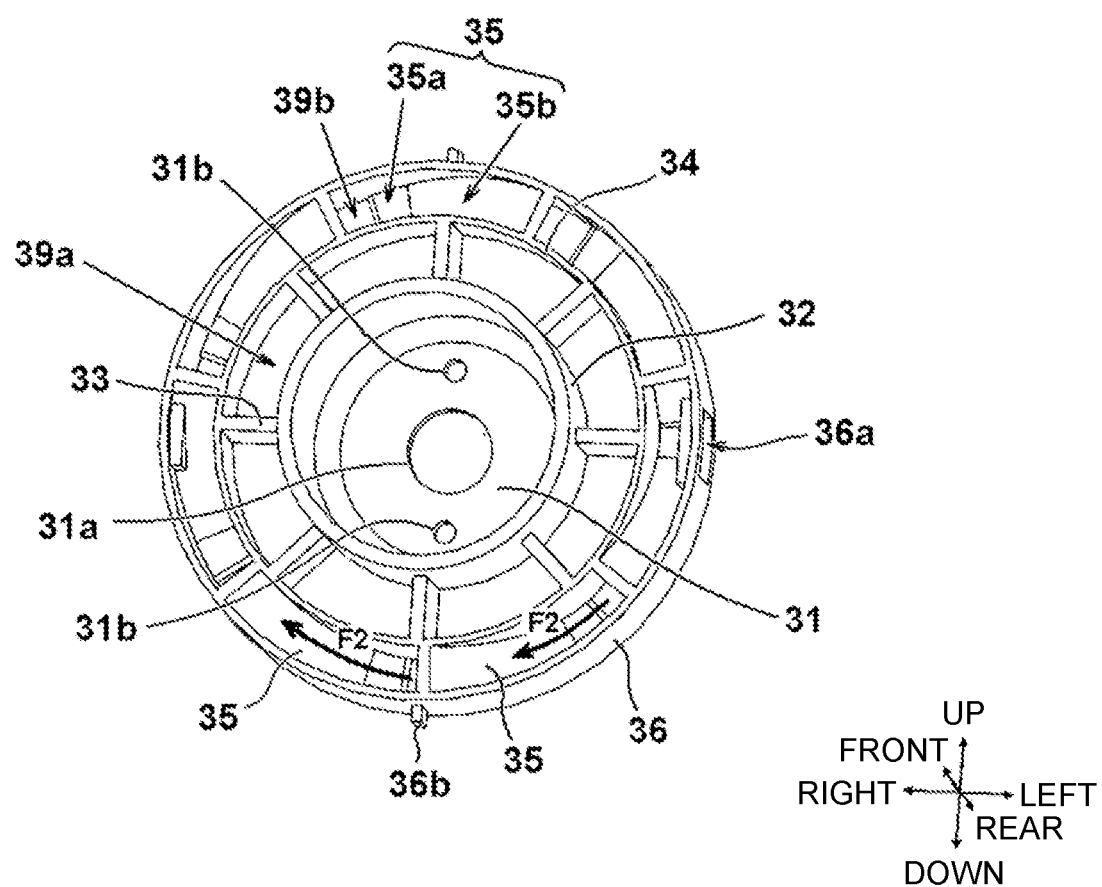
FIG. 9 is a perspective view of the motor holder 30 alone in FIG. 8.

FIG. 9 is a perspective view of the motor holder 30 alone of FIG. 8. From FIG. 9, the size of the inner tubular part 32, the middle tubular part 34, and the outer tubular part 36 of the motor holder 30, and the positional relationship between the radial ribs 33 connecting them and the second stationary blade 35 can be understood. The rear surface side of the inner tubular part 32 is closed by the rear wall part 31 extending in the radial direction. The opening 31a through which the bearing holder 15a (refer to FIG. 8) of the motor 11 passes is formed in the central axis of the rear wall part 31. Further, two screw holes 31b are formed on the outside in the radial direction from the opening 31a. The axial lengths of the middle tubular part 34 and the outer tubular part 36 are the same. Eight radial ribs 33 are disposed at equal intervals in the circumferential direction, and seven second stationary blades 35 are disposed at equal intervals in the circumferential direction. The outer tubular part 36, the middle tubular part 34, the inner tubular part 32, the second stationary blade 35, and the radial ribs 33 form a second rectification part. The radial rib 33 is an example of a first rib, and the second stationary blade 35 is an example of a second rib.

The second stationary blade 35 is a fin formed so that a position of the axis A1 changes in the circumferential direction, and is disposed obliquely with respect to the radial rib 33, and guides the air discharged forward while being swirled from the rear side by the fan 16. Here, the second stationary blade 35 is configured of a flat surface part 35a orthogonal to the axis A1, and a curved part 35b of which a position in the direction of the axis A1 becomes forward as it goes in the circumferential direction from the connection part of the flat surface part 35a and in the same direction as a rotation direction of the fan 16. Since the purpose of mounting the second stationary blade 35 is to smoothly guide the air discharged from the fan 16 to the front side, as long as this purpose can be achieved, the second stationary blade 35 may be realized not only by the flat surface part 35a and the curved part 35b but also by other shapes. A space between the adjacent second stationary blade 35 is the opening part 39b which serves as the air passage, and air flows in the direction of the arrow F2.

Figure 10:
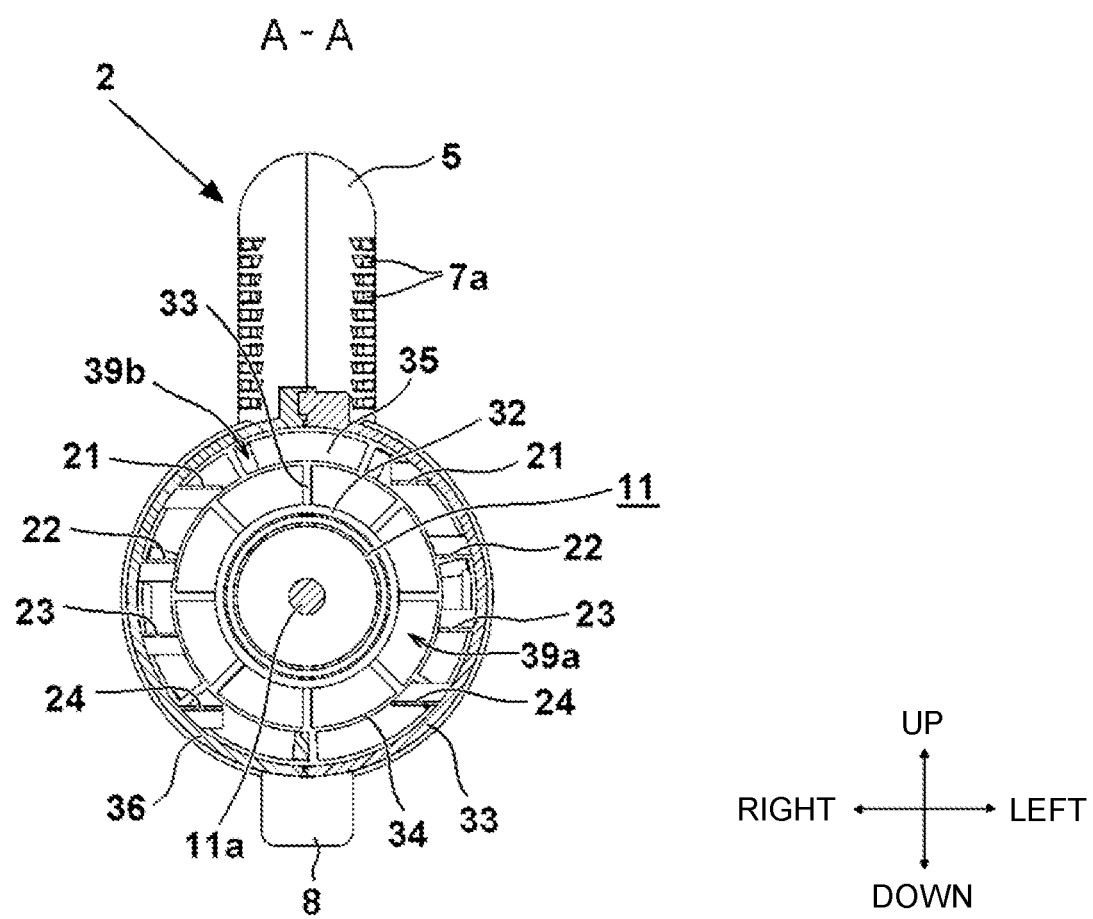
FIG. 10 is a cross-sectional view of an A-A portion of FIG. 4.

FIG. 10 is a cross-sectional view of a A-A portion of FIG. 4. In the fan case part 3, the motor holder 30 is sandwiched between the left and right parts of the left and right divided housing 2. Therefore, the outer tubular part 36 of the motor holder 30 has a structure in which it is in contact with the inner wall of the fan case part 3 or is in contact with the inner wall of the fan case part 3 via an elastic body. Seven second stationary blades 35 are formed between the outside of the middle tubular part 34 and the inner peripheral side of the outer tubular part 36 when viewed in the radial direction, and a space between the adjacent second stationary blades 35 becomes the opening part 39b through which air flows. The second stationary blade 35 not only serves as a guide plate for guiding the air flow in a predetermined direction, but also serves as a frame for connecting the outside of the middle tubular part 34 to the inner peripheral side of the outer tubular part 36. Since the space between the outside of the inner tubular part 32 and the middle tubular part 34 is not the main space through which air flows, the radial rib 33 as a frame for firmly holding the accommodating part (the inner tubular part 32) of the motor 11 is provided in the motor holder 30. The radial rib 33 has a planar shape extending in the radial direction and the axial direction, and eight radial ribs 33 are formed at equal intervals in the circumferential direction. Since a distance between the outside of the inner tubular part 32 and the middle tubular part 34 is arbitrary, when it is desired to make the opening part 39b, which is the air passage, wider than the state shown in FIG. 10, a diameter of the middle tubular part 34 may be reduced, the second stationary blade 35 may be extended in the radial direction, and a radial size of the opening part 39b may be increased.

According to the above-described embodiment, since the first rectification part 20 (21 to 24) is formed on the inner peripheral side of the fan case part 3, the swirling component of the air flow discharged from the fan 16 can be attenuated to make the air flow in the fan case part 3 smooth, and the air blowing performance of the blower 1 can be improved. Further, since the second stationary blade 35 is formed on the motor holder 30, it is possible to reduce the turbulence of the wind discharged from the fan 16. Further, since the second stationary blade 35 is integrally formed with the motor holder 30, even when the motor 11 to be used is changed and product variations are added, it is only necessary to change the shape of the motor holder 30, and thus cost at the time of design change can be reduced.

Although the present invention has been described above based on the embodiment, the present invention is not limited to the above-described embodiment, and various modifications can be made without departing from the spirit of the present invention. For example, in the above embodiment, although the blower has been exemplified and described, a filter type or cyclone type cleaner is also a kind of blower, and the present invention can be applied to a housing configuration thereof. In that case, the first stationary blade part may be provided on the inner wall part on the downstream side of the air flow discharged from the fan.

What is claimed is:

1. A blower comprising:
   a motor with a rotary shaft extending in an axial direction;
   a fan comprising a first wall surrounding the rotary shaft, a second wall surrounding the rotary shaft, and a plurality of curved blades disposed between the first wall and the second wall, the fan configured to rotate by a driving force of the motor and to generate an air flow;
   a tubular motor holder formed in a tubular shape extending in the axial direction of the rotary shaft and configured to hold the motor radially inside thereof; and
   a fan case formed in a tubular shape extending in the axial direction, configured to accommodate the motor, the motor holder, and the fan and to form a flow path of the air flow;
   wherein the fan case has:
   a large diameter portion, accommodating the motor, the motor holder and the fan;
   a cylindrical tip part, having a diameter smaller than a diameter of the large diameter portion, the cylindrical tip part having an opening disposed such that an axial line of the rotary shaft passes through the opening;
   a tapered part, connecting the large diameter portion and the cylindrical tip part, the tapered part is tapered such that, in the axial direction, a diameter of the tapered part becomes smaller moving away from the large diameter portion;
   a plurality of ribs, integrally formed with the tapered part, each rib protrudes inward from an inner peripheral surface of the tapered part, an inward end of each rib is separated from the motor and the motor holder, and each rib extends along the axial direction of the rotary shaft.

2. The blower according to claim 1, wherein a length of the motor holder in the axial direction is shorter than that of the motor.

3. The blower according to claim 1, wherein
   the fan case is formed of two members divided in a left to right direction perpendicular to the axial direction, and
   the plurality of ribs extend in the left to right direction.

4. The blower according to claim 3, wherein the plurality of ribs comprise a rib inclined with respect to the rotary shaft in a view in the left to right direction.

5. The blower according to claim 4, wherein the motor comprises a covered part of which a radial outside is covered by the motor holder and an exposed part of which a radial outside is not covered by the motor holder.

6. The blower according to claim 1, wherein the fan case has a tapered part narrowed so that a diameter of the fan case decreases away from the motor in the axial direction on a downstream side of the motor in a flow path direction of the air flow, and
   the first rectification part is disposed on the tapered part.

7. A blower comprising:
   a motor with a rotary shaft extending in an axial direction;
   a fan comprising a first wall surrounding the rotary shaft, a second wall surrounding the rotary shaft, and a plurality of curved blades disposed between the first wall and the second wall, the fan configured to rotate by a driving force of the motor and to generate an air flow;
   a tubular motor holder formed in a tubular shape extending in the axial direction of the rotary shaft and configured to hold the motor radially inside thereof; and
   a fan case formed in a tubular shape extending in the axial direction, configured to accommodate the motor, the motor holder, and the fan and to form a flow path of the air flow;
   wherein the fan case has a first rectification part integrally molded radially inside thereof,
   the first rectification part comprises a plurality of ribs protruding inward from an inner peripheral surface of the fan case and inclined with respect to the rotary shaft, and
   wherein the first rectification part comprises a first support part in contact with and supporting an outer peripheral surface of the motor.

8. The blower according to claim 7, wherein the motor holder has a second rectification part integrally molded on the motor holder, the second rectification part extends in a radial direction of the rotary shaft.

9. The blower according to claim 8, wherein the second rectification part is a second support part in contact with the motor and the fan case and supporting the motor.

10. The blower according to claim 9, wherein the second rectification part is in contact with the fan case via an elastic body.

11. The blower according to claim 8, wherein the second rectification part comprises a first rib extending in the radial direction and a second rib extending obliquely in the axial direction.

12. A blower comprising:
   a motor with a rotary shaft extending in an axial direction;
   a fan comprising a first wall surrounding the rotary shaft, a second wall surrounding the rotary shaft, and a plurality of curved blades disposed between the first wall and the second wall, the fan configured to rotate by a driving force of the motor and to generate an air flow;

a tubular motor holder formed in a tubular shape extending in the axial direction of the rotary shaft and configured to hold the motor radially inside thereof; and a fan case formed in a tubular shape extending in the axial direction, configured to accommodate the motor, the motor holder, and the fan and to form a flow path of the air flow;

wherein the fan case has a first rectification part integrally molded radially inside thereof, the first rectification part comprises a plurality of ribs protruding inward from an inner peripheral surface of the fan case and inclined with respect to the rotary shaft, and wherein the first rectification part comprises a first support part supporting the motor by interposing an elastic body between the first support part and the motor.

13. The blower according to claim 12, wherein the fan case has:

a large diameter portion, accommodating the motor, the motor holder, and the fan;

a cylindrical tip part, having a diameter smaller than a diameter of the large diameter portion, the cylindrical tip part having an opening disposed such that an axial line of the rotary shaft passes through the opening;

a tapered part, connecting the large diameter portion and the cylindrical tip part, the tapered part is tapered such that, in the axial direction, a diameter of the tapered part becomes smaller moving away from the large diameter portion;

wherein the first support part is integrally formed with the tapered part to be radially inside of the tapered part, the first support part protrudes inward from an inner peripheral surface of the tapered part.

* * * * *